US012508606B2

United States Patent
Crosby et al.

(10) Patent No.: US 12,508,606 B2
(45) Date of Patent: Dec. 30, 2025

(54) VALVE CONTROLLED SPRAYING SYSTEM

(71) Applicant: Spraying Systems Co., Wheaton, IL (US)

(72) Inventors: David G. Crosby, Carol Stream, IL (US); Timothy J. Winter, Vernon Hills, IL (US)

(73) Assignee: Spraying Systems Co., Wheaton, IL (US)

( * ) Notice: Subject to any disclaimer, the term of this patent is extended or adjusted under 35 U.S.C. 154(b) by 677 days.

(21) Appl. No.: 17/797,650

(22) PCT Filed: Feb. 12, 2021

(86) PCT No.: PCT/US2021/017963
§ 371 (c)(1),
(2) Date: Aug. 4, 2022

(87) PCT Pub. No.: WO2021/163567
PCT Pub. Date: Aug. 19, 2021

(65) Prior Publication Data
US 2023/0077566 A1    Mar. 16, 2023

Related U.S. Application Data

(60) Provisional application No. 62/976,892, filed on Feb. 14, 2020.

(51) Int. Cl.
*B05B 1/30*     (2006.01)
*A01M 7/00*    (2006.01)
(Continued)

(52) U.S. Cl.
CPC ......... *B05B 1/3013* (2013.01); *A01M 7/0089* (2013.01); *B05B 1/3006* (2013.01);
(Continued)

(58) Field of Classification Search
CPC ......... B05B 15/20; B05B 15/40; B05B 15/58; B05B 15/658; B05B 1/3013;
(Continued)

(56) References Cited

U.S. PATENT DOCUMENTS 4,660,598 A    4/1987  Butterfield et al.
6,036,107 A *  3/2000  Aspen ................... B05B 9/0423
                                                                137/884

(Continued)

FOREIGN PATENT DOCUMENTS

DE    4407974 A1 * 12/1994 ......... F16K 17/0473
RU    2415545 C1     4/2011
RU    2570868 C2     2/2013

OTHER PUBLICATIONS

European Patent Office, International Search Report in corresponding International Application No. PCT/US2021/017963, dated May 31, 2021 (12 pages).

(Continued)

*Primary Examiner* — Christopher R Dandridge
(74) *Attorney, Agent, or Firm* — Leydig, Voit & Mayer, Ltd.

(57) ABSTRACT

A liquid spraying system having a liquid spray section and a controller for controlling liquid to the spray section. The controller includes a valve operable between multiple positions for controlling the supply of liquid to the spray section and enabling the flow of liquid from the spray section to a flow back line only after the liquid supply to the spray section has been terminated.

13 Claims, 7 Drawing Sheets

(51) Int. Cl.
  *B05B 9/04* (2006.01)
  *B05B 15/20* (2018.01)
  *B05B 15/40* (2018.01)
  *B05B 15/58* (2018.01)
  *B05B 15/658* (2018.01)

(52) U.S. Cl.
  CPC .......... *B05B 1/3093* (2013.01); *B05B 9/0423* (2013.01); *B05B 15/20* (2018.02); *B05B 15/40* (2018.02); *B05B 15/58* (2018.02); *B05B 15/658* (2018.02)

(58) Field of Classification Search
  CPC ... B05B 1/3093; B05B 1/3006; B05B 9/0423; B05B 12/04; B05B 12/085; B05B 13/0278; B05B 7/0884; A01M 7/0089
  See application file for complete search history.

(56) References Cited

U.S. PATENT DOCUMENTS 6,250,564 B1  6/2001  Chahley
6,786,425 B2  9/2004  Rawlings

OTHER PUBLICATIONS

U.S. Appl. No. 09/730,757, filed Dec. 7, 2000.
U.S. Appl. No. 09/504,188, filed Dec. 15, 2000.

\* cited by examiner

VALVE CONTROLLED SPRAYING SYSTEM

CROSS-REFERENCE TO RELATED APPLICATIONS

This patent application claims the benefit of U.S. Provisional Patent Application No. 62/976,892, filed Feb. 14, 2020, which is incorporated herein by reference.

FIELD OF THE INVENTION

The present invention relates generally to valve controlled spraying systems, and more particularly, to an improved valve system for controlling the liquid flow to spray nozzles during operation and upon shutoff of a liquid supply.

BACKGROUND OF THE INVENTION

Agricultural sprayers typically have long spray booms with groups of spray nozzles that are selectively controlled by respective control valves, each of which is individually actuated to permit transmission or termination of liquid to the spray nozzles of the group. Termination of liquid to one or more groups of spray nozzles frequently is necessary, for example, near the ends of fields so as to prevent spraying on non-crop vegetation or the like. The control valves for such spraying systems commonly are mounted in ganged or manifolded side-by-side relationship with respect to each other and remote from the spray nozzles they control. Each control valve is provided with a valve element that is movable between open and closed positions to selectively control the flow of liquid to the spray nozzles of the respective group.

Control valves are known which includes a rotatable ball valve that is rotatable between a one position that enables the direction of pressurized liquid through the control valve to the liquid supply line to the spray nozzle or groups of spray nozzles and a second position which closes a liquid inlet port of the valve and redirects remaining downstream liquid in the line to a return line for recirculation to a liquid supply tank. During rotary movement of the ball valve to a closed position, however, the liquid inlet port does not completely close prior to opening of a port to the return line, which results in spurts of high pressure liquid through the control valve prior to complete closure of the inlet port. In sophisticated agricultural sprayers today, liquid directed in the field often is monitored by means of the quantity liquid directed to the spray nozzles, and the redirection of liquid to the return line prior to valve shutoff can affect accuracy in monitoring the liquid chemical usage. While proposals have been made for preventing such occurrence, such proposals have been relatively complex and expensive, requiring multiple valving mechanisms.

OBJECTS AND SUMMARY OF THE INVENTION

It is an object to provide a valve controlled spraying system which enables more efficient and accurate monitoring of liquid supplied to the sprayer based upon the liquid inlet feed.

Another object of the present invention to provide a valve controlled spraying system as characterized above that is operable for shutting off the liquid supply to the spray nozzles without unwanted bursts of liquid through the control valve that can affect the accurate monitoring of chemical usage.

A further object is to provide a valve controlled spraying system of the above kind having a liquid supply control valve operable for completely shutting of liquid supply to the spray nozzles prior to enabling the direction of downstream liquid in spray nozzle feed lines to a return line to the liquid supply.

Another object is to provide a valve controlled system of the above kind which is relatively simple in construction and operation and lends itself to economical manufacture and reliable usage.

Other objects and advantages of the invention will become apparent upon reading the following detailed description and upon reference to the drawings, in which:

Figure 1:
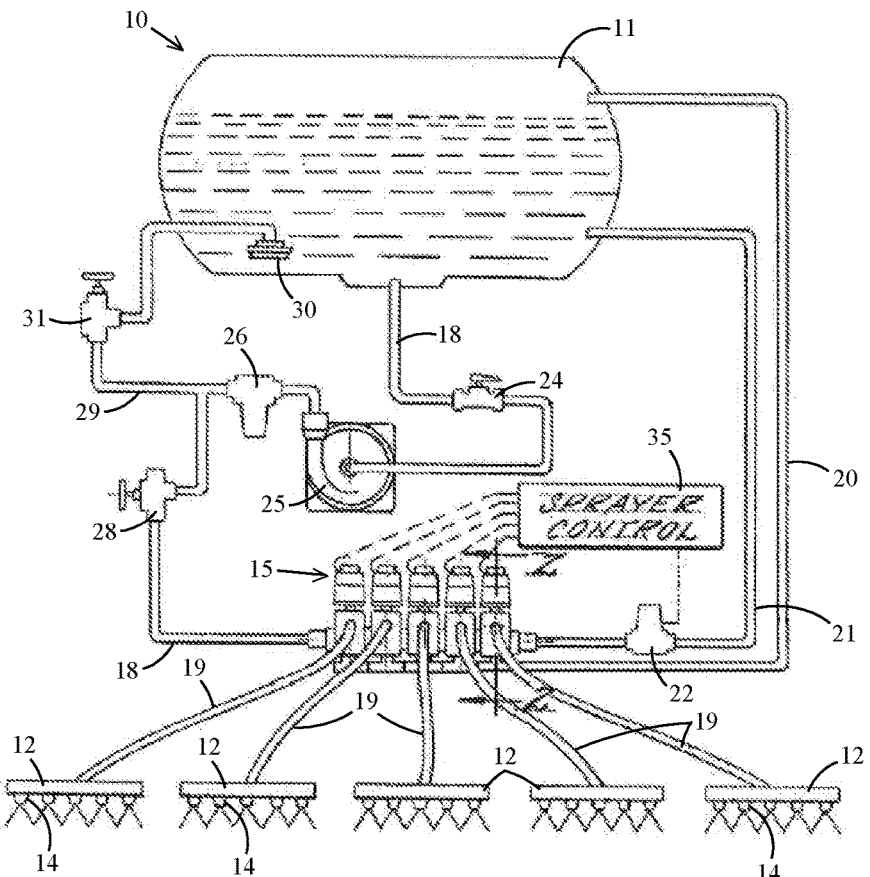
FIG. 1 is a schematic diagram of an illustrative spraying system having control valves in accordance with the present invention.

While the invention is susceptible to various modifications and alternative constructions, a certain illustrated embodiment thereof has been shown in the drawings and will be described in detail below. It should be understood, however, that there is no intention to limit the present invention to the disclosed structural form. On the contrary, the intention is to cover all modifications, alternative constructions, and equivalents that fall within the spirit and scope of the invention. Hence, while the present invention will be described in connection with gang mounted control valves for an agricultural spraying system, it will be understood that the invention is equally applicable to control valves for other types of liquid spraying or transfer systems.

DETAILED DESCRIPTION OF THE PREFERRED EMBODIMENTS

Referring now more particularly to FIG. 1 of the drawings, there is shown an illustrative agricultural spraying system 10 which includes a supply tank 11 for containing a quantity of liquid to be sprayed, a plurality of spray sections 12 each having a plurality of spray nozzles 14 through which liquid is discharged, and a group of spray control valves 15 in accordance with the invention which are mounted in a ganged or manifolded side-by-side relationship with respect to each other and are adapted to control the flow of liquid from the supply tank 11 to the spray sections 12. Basically, the spraying system 10 is similar to that disclosed in the above referenced U.S. Pat. No. 6,036,107, the disclosure of which is incorporated herein by reference.

As is customary in agricultural sprayers, the spraying system 10 includes a supply line 18 between the supply tank 11 and the group of control valves 15 for transmitting liquid to the control valves 15, a discharge line 19 between each control valve 15 and a respective spray section 12 for delivering liquid to the spray section 12, a return line 20 that provides return communication between the control valves 15 and the supply tank 11, and a regulation line 21 having a regulation valve 22 between the group of control valves 15 and the supply tank 11 for facilitating regulation of the system pressure.

The supply line 18 of the illustrated spraying system 10 includes a shut-off valve 24 which permits manual flow stoppage of liquid from the supply tank 11, a pump 25 which pressurizes liquid in the supply line 18, a strainer 26 for filtering debris from the supply line 18, and a throttling valve 28 which permits manual regulation of flow. The supply line 18 also includes a return line 29 which, in this case, branches off from the supply line 18 at a point downstream of the pump 25 and returns to the supply tank 11. As shown in FIG. 1, this return line 29 includes an agitator 30 located within the supply tank 11 which mixes the liquid within the supply tank 11 based upon the flow rate through the return line 29. A throttling valve 31 also is provided in the return line 29 which may be manually adjusted to regulate the flow rate through the return line 20 and to adjust the mixing rate of the agitator 30. The illustrated spraying system 10 is provided with a computer operated sprayer control 35 which is operatively connected to each of the control valves 15 of the group and the regulating valve 22, in a known manner.

Figure 2:
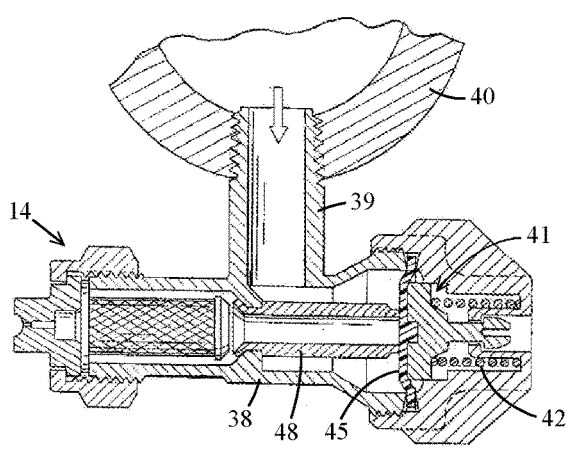
FIG. 2 is an enlarged fragmentary section of one of the spray nozzle assemblies and its associated check valve included in the spraying system shown in FIG. 1, showing the check valve in a closed position.
Figure 3:
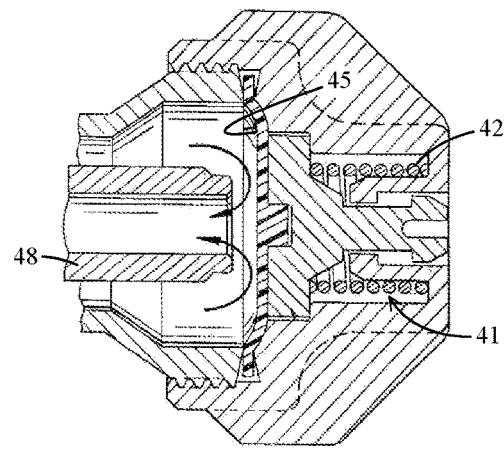
FIG. 3 is an enlarged fragmentary section of the illustrated check valve, showing the check valve in an open position.

The illustrated spray nozzles 14, as depicted in FIGS. 2 and 3, may be of conventional type, in this case each having a nozzle body 38 with a stem 39 supported in fluid communication with a liquid supply boom 40 of the spray section 12, which in turn is coupled to a respective supply line 19. The spray nozzles 14 each have a have a respective check valve 41, such as disclosed in commonly assigned U.S. Pat. No. 4,660,598, the disclosure of which is incorporated herein by reference. When the pressure of liquid delivered to the spray nozzle 14 via the supply line 19 exceeds the force of a biasing spring 42, the pressurized liquid urges a diaphragm 45 away from an upstream end 46 of an inlet tube 48 as shown in FIG. 3, so as to enable liquid to flow through the inlet tube 48 and be discharged from the spray nozzle. Upon shutting off of pressurized liquid from the supply source, the spring 42 forces the diaphragm into sealing engagement with the upstream end of the tube 48 so as to prevent further liquid from discharging or dripping from the spray nozzle 14.

Figure 4:
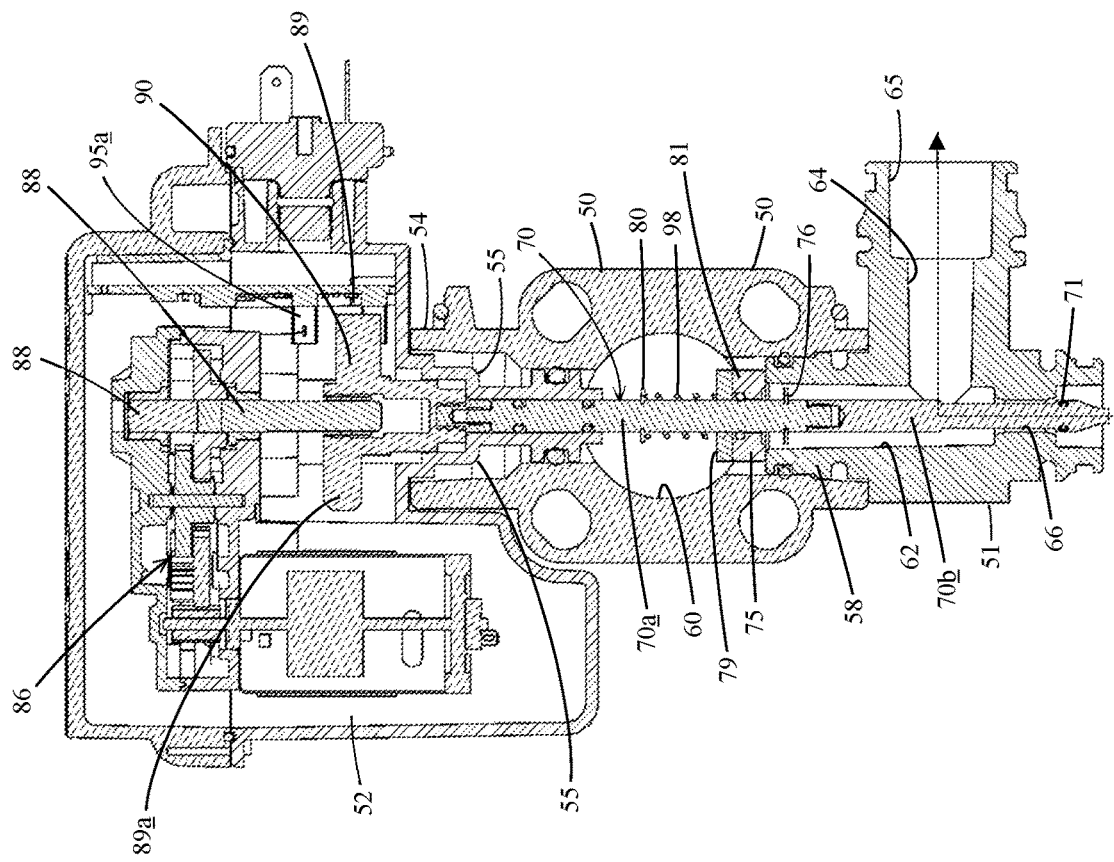
FIG. 4 is an enlarged vertical section of one of the illustrated control modules taken in a plane perpendicular to a central liquid port of the control module showing the valve stem thereof in an open position for communicating liquid from the central liquid supply port to an outlet port of the control valve.
Figure 5:
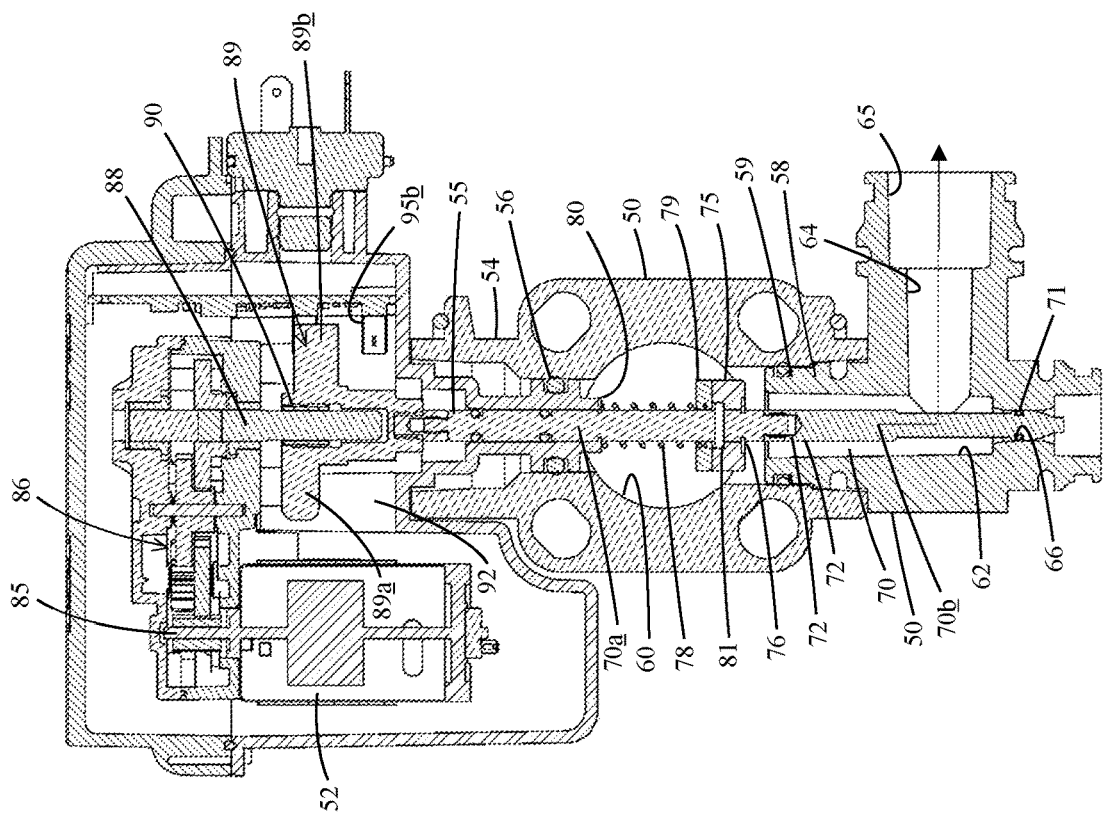
FIG. 5 is a vertical section, similar to FIG. 4, but showing the valve stem in a lowered position which blocks the flow of liquid from the liquid supply port to an outlet port to the spray nozzles while opening a flowback or return port communicating with a return line.
Figure 6:
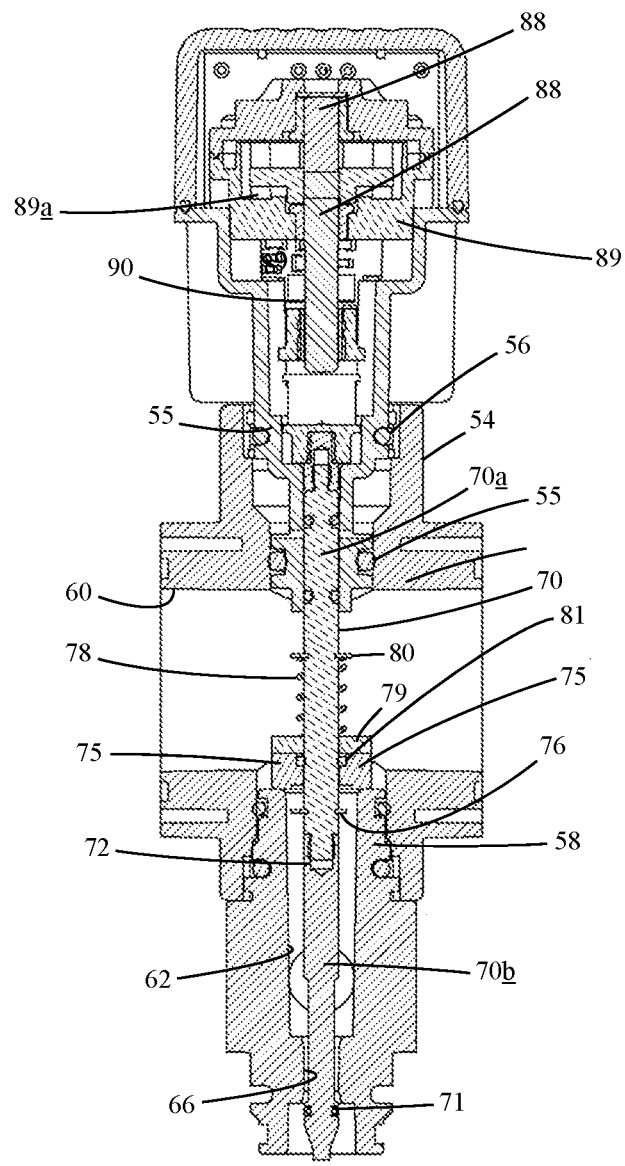
FIG. 6 is a vertical section of the control module shown in FIG. 5 taken in a plane perpendicular to that of FIG. 5.

The control valves 15 of the spray sections 12 each have a modular construction and are mounted in ganged or manifold relation in a manner similar to that disclosed in the above referenced U.S. Pat. No. 6,036,107. The control valves 15, as shown in FIGS. 4-6 each have a main valve body 50, a lower valve body 51 supported in depending relation to the main valve body 50, and an electric valve control motor 52 supported on top of the main valve body 50. The main valve body 50 in this case has an upwardly opening annular collar 54 that receives and supports an annular mounting section 55 of a housing of the motor 52 with an annular sealing rings 56 there in between, and the lower valve body 51 has an upwardly extending reduced diameter hub section 58 supported within a lower end of the main valve body 50 with sealing O-ring 59 therebetween. The main valve body 50 includes a central transversely oriented main liquid supply port 60 for receiving liquid from the supply line 18, and the lower valve body 51 has a central vertical liquid passage 62 for communication with the liquid supply port 60. The central vertical passage 62 in turn communicates with a transverse passage 64 having a liquid outlet port 65 and a reduced downstream flowback or return port 66 adjacent a lower end of the valve body 51. The control valves 15 are ganged with the liquid supply ports 60 of the plurality of control valves communicating with each other and with the liquid supply line 18, and with each liquid outlet port 65 being coupled to a respective liquid supply line 19 to a spray section 12 and each liquid flowback or return port 66 coupled to the return line 20.

In accordance with an important feature of the present embodiment, each control valve 15 has a single valve stem 70 for controlling the flow of liquid from the main liquid supply port 60 to the outlet port 65 and respective supply line 19 and to the liquid flowback or return port 66 and return line 20. To this end, the valve stem 70 extends centrally through the main valve body 50, the liquid supply port 60, and the central liquid supply passage 62 of the lower valve body 51. The valve stem 70 in this case extends the length of the main and lower valve bodies 50, 51 with a lower end thereof being positionable through a lower flowback or return port 66. An annular seal 71 is supported about a lower end of the valve stem 70 (FIG. 9A) for sealing contact with the reduced diameter flowback or return port 66, as will become apparent. For ease of manufacture, the valve stem 70 in this case has an upper and lower sections 70a, 70b fixedly secured together by a threaded coupling 72.

For controlling the supply of liquid from the liquid supply port 60 to the central passage section 62 and outlet port 65 of each spray nozzle 14, an annular seal 75 is supported on the stem 70 within the main liquid supply port 60, as depicted in FIG. 4. The main annular seal 75 is biased downwardly against an E-clip 76 fixed to the stem 70 by a coil spring 78 interposed between a washer 79 on an upper side of the annular seal 75 and an upper E-clip 80 fixed to the stem a distance above the washer 79. An O-ring seal 81 in this case is mounted in surrounding relation to the valve stem 70 within the annular seal 75.

Figure 11:
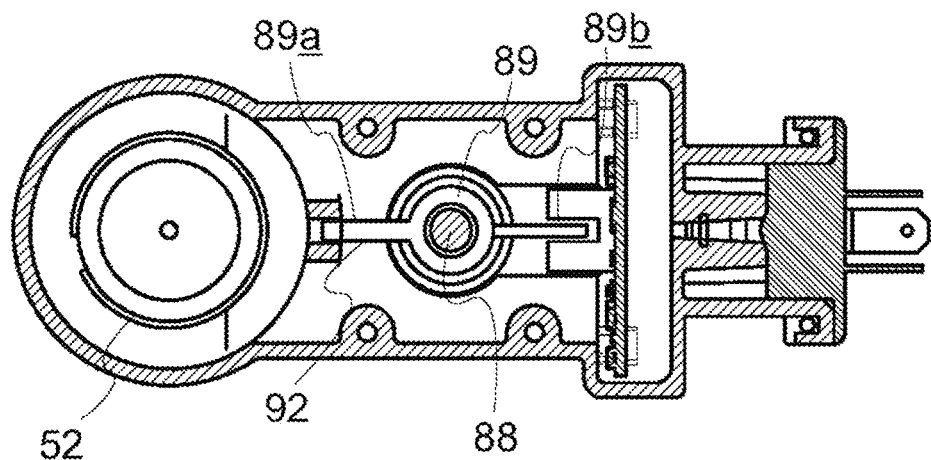
FIG. 11 is an enlarged horizontal section of the control module taken in the plane of line 11-11 in FIG. 7.
Figures 12, 13:
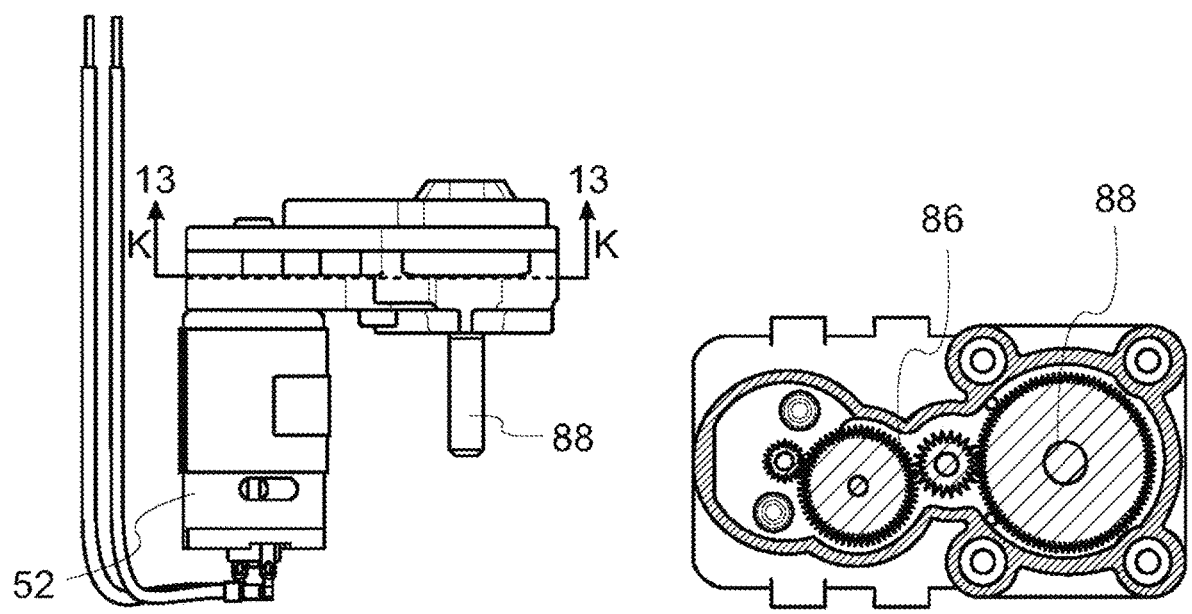
FIG. 12 is a side elevational view of the electric motor and valve stem drive of the illustrated control module.
FIG. 13 is a section of the motor and valve stem drive taken in the plane of line 13-13 in FIG. 12.

For raising and lowering the valve stem 70 between open and closed positions, the electric motor 52 is operatively coupled to the valve stem 70. To this end, the electric motor 52 may be a 12 V DC, reversible motor, having a drive shaft 85 coupled to a drive train 86 for rotating an output shaft 88 supported in depending relation to the drive train 86 above valve steam 70. To facilitate controlled raising and lowering the valve stem 70 as an incident to rotation of the output shaft 88, an optical switch flag 89 affixed to an upper end of the valve stem 70 is threadedly supported on a threaded section 90 the output shaft 88. The switch flag 89 is retained against rotation such that driven rotation of the output shaft 88 will cause that switch flag 89 and valve stem 70 coupled to the underside thereof to be raised or lowered relative to the valve bodies 50, 51. For guiding raising lowering of the switch flag 89, and hence the valve stem 70, a transverse leg section 89*a* on one side of the flag switch 89 is guided for movement within a guide track 92 fixed within the motor housing (FIG. 11).

Figure 10:
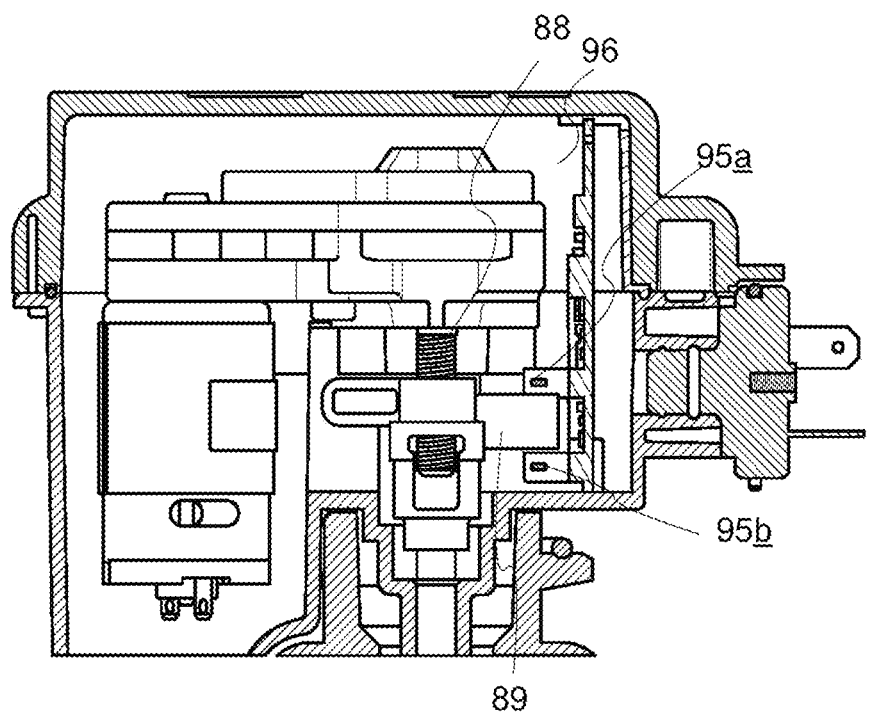
FIG. 10 is an enlarged perspective of the electric motor and valve stem drive of the illustrated control module.

For controlling upper and lower movement of the valve stem 70, the switch flag 89 has a thinner leg section 89*b* on a side opposite the guide flag section 89*a* and is movable with the valve stem 70 between optical sensors 95*a*, 95*b* that control the electric motor 52 and limit upper and lower movement of the switch flag 89, and hence the valve stem 70. The optical sensors 95*a* and 95*b* in this case are coupled to a circuit board 96 (FIG. 10) that effects operation of the electric motor 52, via an appropriate operator control, and movement of the valve stem 70 between the sensors 95*a*, 95*b*.

Figure 7:
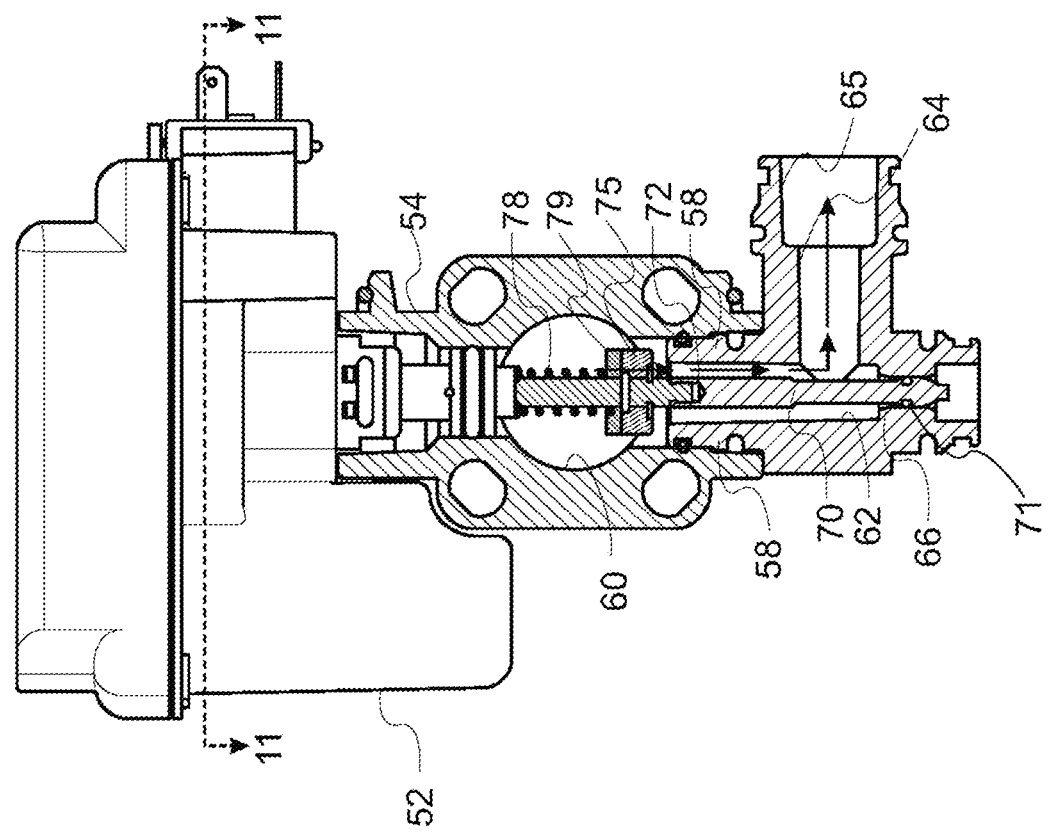
FIG. 7 is a partial section of the control module, similar to FIG. 4, showing the valve stem in an open position permitting communication of liquid through an outlet port to spray nozzles.

In keeping with a further important aspect of the present embodiment, each control valve 15 is operable such that the valve stem 70 completely closes and seals off communication between the main liquid inlet port 60 and the central flow passageway 62 to the outlet port 65 to the spray section 12 prior to enabling communication from the outlet port 65 and supply line 19 to the flowback or return port 66. As depicted in FIGS. 4 and 7, when the electric motor 52 has rotated the output shaft 88 to raise the flag switch 89 and valve stem 70 coupled thereto to an upper position with the flag switch section 89*b* in contact with the upper optical sensor 95*a*, the annular seal 75 carried by the valve stem 70 is raised to an open position permitting communication of liquid from the main inlet port 60 of the control module to the central and transverse passage sections 62, 65 and output port 65 to the spray system 12. The lower E-clip 76 carries and supports the annular seal 75 to such raised or open position. Simultaneously, the lower end of the valve stem 70 is raised and positioned in a closed position in the flowback or return port 66, with the annular seal 71 preventing passage of liquid from both the central passage 62 and outlet port 60 to the flowback or return port 66.

Figure 8:
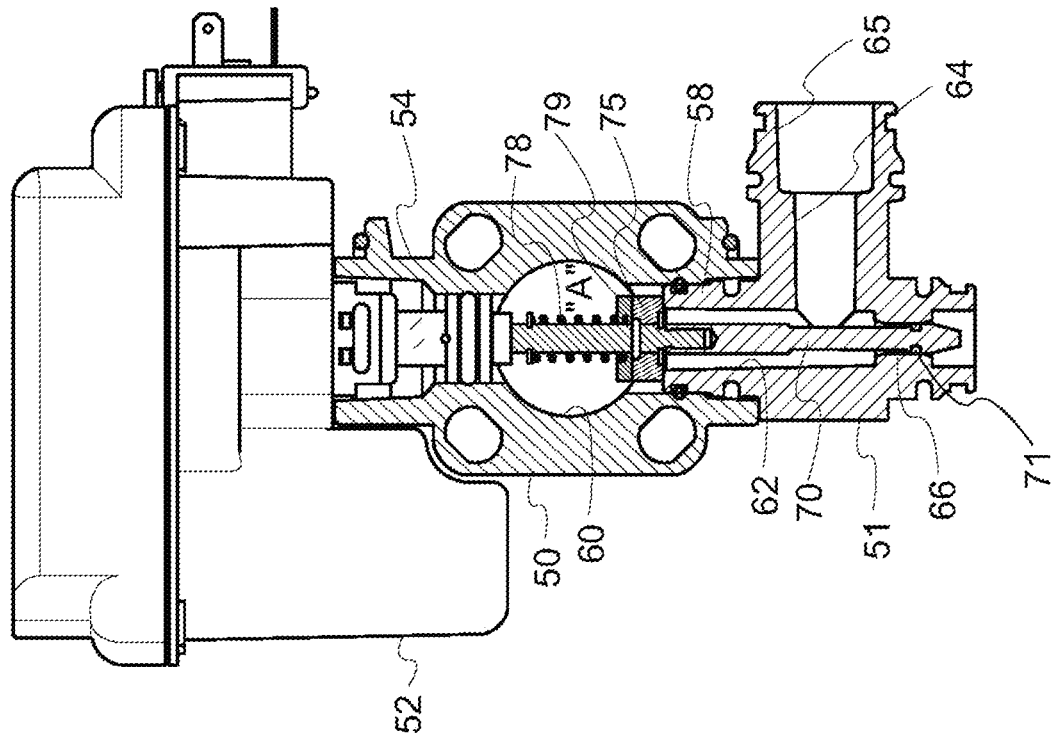
FIG. 8 is a figure similar to FIG. 7, but showing the valve stem in an intermediate position blocking the flow of liquid to both the liquid outlet port to the spray nozzles and to the flowback or return port of the module.
Figures 9, 9A:
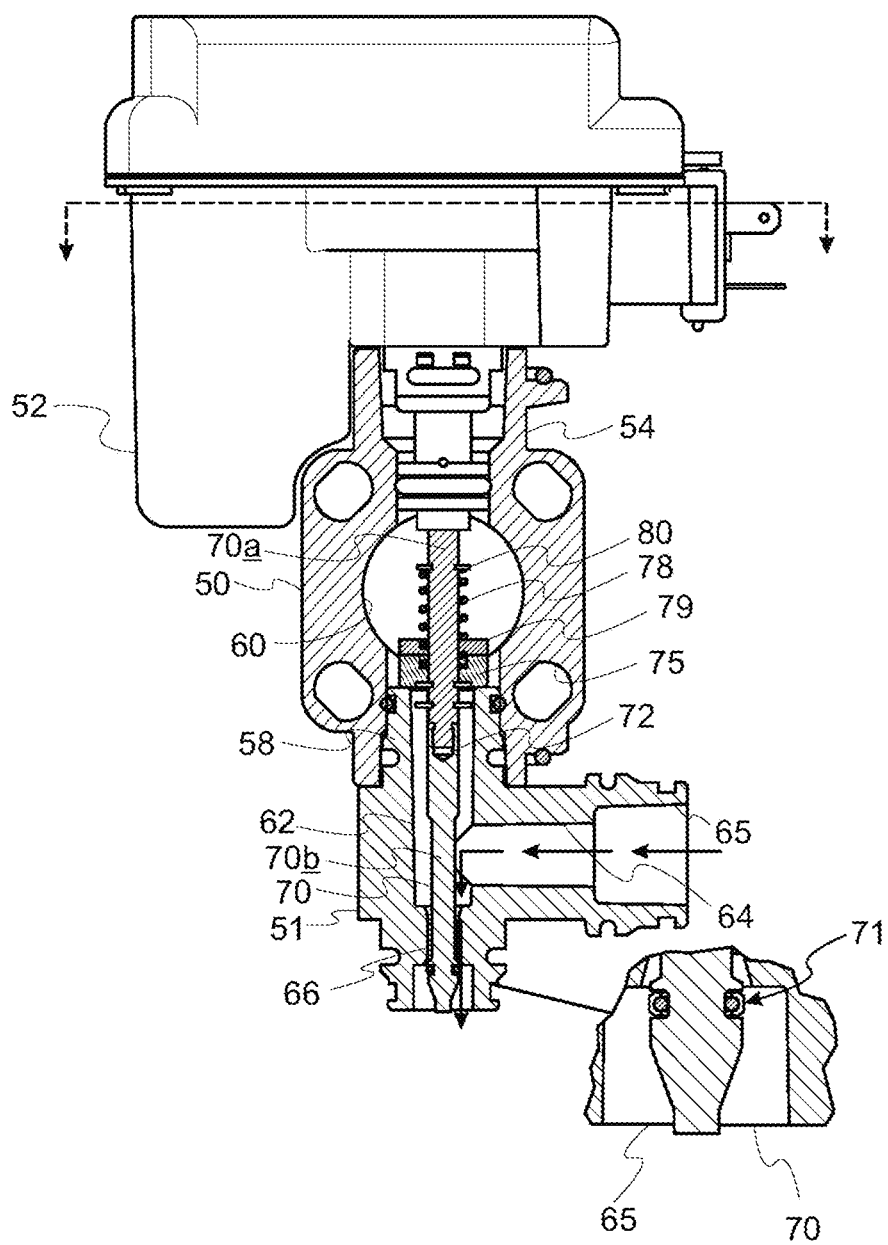
FIG. 9 is a partial section similar to FIGS. 5 and 6, showing the valve stem in a lowered position blocking the flow of liquid through the inlet port and permitting the return flow of liquid to a flowback or return port.
FIG. 9A is an enlarged blow up of the lower valve stem in FIG. 9.

For preventing liquid communication to the outlet port 65 and spray section 12, the electric motor 52 is operated in the reverse direction under control for the circuit board 96, rotating the output shaft 88 in an opposite direction that lowers the optical switch flag 89 and valve stem 70 downwardly to an intermediate position that initially closes both the liquid inlet port 60 while flowback and return port 66 remains closed, as depicted in FIG. 8. In such intermediate position it can be seen that the annular seal 75 is biased into position closing the inlet port 60 while the lower valve stem 70 continues to close the flowback port 66. Continued operation of the drive motor 52 and rotation of the output drive shaft 88 further lowers the valve stem 70 a sufficient distance that the annular seal 71 at the lower end of the valve stem 70 is disposed beyond the reduced diameter flowback or return port 66. During such movement, the annular seal 75 remains biased by the biasing spring 78 in its closed position, while the valve stem 70 and the E-clip 76 that supports the annular seal 75 continue to move downwardly with the valve stem 70 (FIGS. 6 and 9). Upon lowering of the valve stem 70 and optical switch flag 89 to the level that the flag section 89*b* contacts the lower optical sensor 95*b*, the lower end of the valve stem 70 and annular seal 65 are disposed beyond the reduced diameter outlet or return port 66, thereby enabling communication of any downstream liquid to be drained back through the flowback outlet 66 to the return line 20. It will be appreciated that since the inlet port 60 is completely closed prior to opening of the flowback or return port 66, there are no bursts or any other communication of liquid from the inlet port 60 to the return port 66 and return line 15 during liquid shutoff to the spray section 12 or other appreciable loss of supply liquid that significantly affects reliable monitoring of the liquid chemical or the like.

To resume spraying, the drive motor 52 can be operated in reverse direction, raising the switch flag 89 and valve stem 70 to a position that first closes the flowback or return port 66 while the annular seal 75 remains biased in a position closing the inlet port 60 and then upon continued raising of the valve stem 70 and to the level that the optical switch flag section 89*b* engages the upper optical sensor 95*a*. Such further movement causes the E-clip 76 to lift the annular seal 75 and open the main liquid supply port 60, as depicted in FIG. 4, for communicating liquid to spray section 12.

From the foregoing, it can be seen that a valve control spraying system is provided that is operable for shutting off and turning on the liquid supply to the spray nozzles without unwanted bursts of liquid through the control valve that can affect accurate monitoring of liquid chemical usage. The valving system utilizes a single valve stem that is controlled for completely shutting off liquid to the spray nozzles prior to enabling drainage of liquid to a return line of the spraying system. It can also be seen that the valve control system is relatively simple in construction and operation and lends itself to economical manufacture and reliable usage.

The invention claimed is:

1. A liquid spraying system (10) for spraying agricultural chemicals comprising:
    a liquid spray section (12) having at least one liquid spray nozzle (14);
    a liquid supply (11) of a liquid agricultural chemical;
    a liquid control valve for controlling the flow of said liquid from said liquid supply (11) to said spray section for discharge from said at least one spray nozzle (14);
    said liquid control valve (15) having a valve body (50, 51) with a liquid supply port (60), a liquid outlet port (65), and a liquid flow back port (66);
    a first liquid supply line (18) for directing said liquid from said liquid supply (11) to said liquid supply port (60);
    a second liquid supply line (19) for directing said liquid from said liquid supply port (60) to said spray section (12); a flow back line (20) coupled to said flow back port (66) for directing said liquid in said second liquid supply line (19) away from said spray section (12) upon termination of the supply of liquid to said spray section (12);
    said control valve (15) having a valve stem (70);
    said control valve (15) being operable for moving said valve stem (70) between (1) a first position that opens said liquid supply port (60) for enabling the direction of said liquid from said first liquid supply line (18) through said liquid supply port (60) and liquid outlet port (65) to said second liquid supply line (19) and liquid spray section (12) for discharge from said at least one spray nozzle (12) while blocking flow of said liquid through said flow back port (66) to said flow back line (20), (2) a second position that blocks the supply of liquid from first liquid supply line (18) through said liquid supply port (60) to said liquid outlet port (65) and second liquid supply line (19) while continuing to block the flow of said liquid through said flow back port (66) to said flow back line (20); and (3) to a third position wherein during movement to said third position said valve stem (70) continues to block the flow of said liquid from said first liquid supply line (18) through said liquid supply port (60) and liquid outlet port (65) while opening said flow back port (66) for allowing the remaining of said liquid in said second liquid supply line (19) to flow back through said flow back port (66) and flow back line (20) such that the flow of said liquid from said second liquid supply line (19) to said liquid flow back line (20) is only possible when said liquid supply port (60) is closed.

2. The liquid spraying system of claim 1 in which said valve stem (70) extends through both said liquid supply port (60) and flow back port (60) and in said first position allows the flow of said liquid from through liquid supply port (60) and liquid outlet port (65) to said second liquid supply line (19) while simultaneously blocking the flow through said flow back port (66), and in said second position simultaneously blocks the flow of said liquid through both said liquid supply port (60) and flow back port (66), and upon movement of said valve stem (70) to said third position continues to block the flow of liquid through said supply port (60) and while opening said the flow back port (66) for allowing remaining of said liquid in said second liquid supply line (15) to flow to said flow back line (20).

3. A liquid spraying system of claim 1 in which said valve stem (70) is threadedly supported in said valve body (50, 51) for relative longitudinal movement, and including a motor (52) coupled to said valve stem (70) for selectively rotating said valve stem (70) for moving said valve stem (70) between said first, second, and third positions.

4. The liquid spraying system of claim 3 including a control for controlling operation of said motor (52), said control including a switch (89) carried by said valve stem (70) for movement with said valve stem (70) between said first, second and third positions, and a pair of longitudinally spaced sensors (95a, 95b) on said valve body (50, 51) engageable by said switch (89) for controlling operation of said motor (52) and limiting movement of said valve stem (70) between said first and said third positions.

5. The spraying system of claim 1 in which said valve stem (70) carries a first sealing member (75) for closing said liquid supply port (60) when said valve stem (70) is in said second and third positions and a second sealing member (71) for closing said flow back port (66) when said valve stem (70) is in said first and second positions.

6. The spraying system of claim 5 in which said first sealing member is an annular sealing member mounted on said valve stem (70) and spring biased for relative movement such that upon movement of said valve stem (70) from said first position to said second and third positions said first sealing member (75) closes said liquid supply port (60) while allowing continued movement of said valve stem (70) to said second and third positions.

7. The spraying system of claim 1 in which said valve body (50, 51) has an elongated liquid flow passage (62) communicating between said liquid supply port (60) and said flow back port (66); said valve stem (70) being mounted for reciprocating movement in said elongated flow passage (62) between said first, second and third positions; said second liquid supply line (19) communicating with said elongated liquid passage (62) at an intermediate location between said liquid supply port (60) and flow back port (66); and said valve stem (70) when in said first permits the flow of said liquid from said liquid supply port (60) through said elongated liquid flow passage (62) to said second liquid supply line (19) while blocking the flow of said liquid through said flow back port (66) to said flow back line (20), and when in said second position blocks the flow of said liquid through said liquid supply port (60) to said elongated liquid flow passage (62) while simultaneously blocking the flow of said liquid from said elongated flow passage (62) through said flow back port (66), and as an incident to movement to said third position opens said flow back port (66) for enabling communication of said liquid from said second liquid supply line (19) and through said elongated liquid flow passage (62) and flow back port (66) to said flow back line (19) and while continuing to block the flow of said liquid from said liquid supply line (18) through said liquid supply port (60) to said elongated liquid flow passage (62).

8. The liquid spraying system of claim 1 in which said valve body has a liquid flow passage (62) communicating between said liquid supply port (60) and said flow back port (66); and said second liquid supply line (19) communicates with said valve body liquid flow passage (62) at a location between said liquid supply port (60 and liquid flow back port (66).

9. The liquid spraying system of claim 8 in which said valve stem (70) extends through said valve body liquid flow passage (62) and both said liquid supply port (60) and flow back port (66) and in said first position allows the flow of said liquid from through liquid supply port (60) to liquid outlet port (65) and second liquid supply line (19) while simultaneously blocking the flow of said liquid through said flow back port (66), and in said second position simultaneously blocks the flow of said liquid through both said liquid supply port (60) and flow back port (66), and upon movement of said valve stem (70) to said third position continues to block the flow of said liquid through said supply port (66) and then opens said the flow back port (66) for allowing remaining liquid in said second liquid supply line (19) to flow to said flow back line (20).

10. A liquid spraying system of claim 8 in which said valve stem (70) is threadedly supported in said valve body (50, 51) for relative longitudinal movement, and including a motor (52) coupled to said valve stem (70) for selectively rotating said valve stem (70) for moving said valve stem (70) between said first, second, and third positions.

11. The spraying system of claim 8 in which said valve stem (70) carries a first sealing member (75) for closing said liquid supply port (60) when said valve stem (70) is in said second and third positions and a second sealing member (71) for closing said flow back port (66) when said valve stem (70) is in said first and second positions.

12. The spraying system of claim 10 in which said first sealing member (75) is mounted on said valve stem (70) and spring biased for relative movement such that upon movement of said valve stem (70) from said first position to said second position said first sealing member (75) closes said liquid supply port (60) while allowing continued movement of said valve stem (70) to said second and third positions.

13. The spraying system of claim 11 in which said valve stem (70) carries said second sealing member (71) in longitudinally spaced relation to said first sealing member (75) for blocking the flow of said liquid through said flow back port (66) to said flow back line (20) when said valve stem is in said first and second positions and upon movement of said valve stem (70) to said third position said second annular sealing member (71) is carried by the valve stem (70) to a position that opens said flow back port (66) for permitting the flow of said liquid from said second liquid supply line (19) through liquid outlet port (65) and flow back port (66) to said flow back line (20).

\* \* \* \* \*